United States Patent [19]

Lefevre

[11] 4,278,620
[45] Jul. 14, 1981

[54] APPARATUS FOR REDUCING THE DETRIMENTAL WIND INFLUENCE ON COOLING TOWERS

[75] Inventor: Marcel R. Lefevre, Branchburg, N.J.

[73] Assignee: Research-Cottrell, Inc., Somerville, N.J.

[21] Appl. No.: 122,174

[22] Filed: Feb. 19, 1980

[51] Int. Cl.³ .............................................. B01F 3/04
[52] U.S. Cl. ............................. 261/109; 165/DIG. 1; 261/DIG. 11
[58] Field of Search ....... 261/109, DIG. 11, DIG. 77; 165/DIG. 1; 98/29, 40 R, 40 V, 40 VM, 44

[56] References Cited

U.S. PATENT DOCUMENTS

| | | | |
|---|---|---|---|
| 2,907,554 | 10/1959 | Heller | 261/DIG. 11 |
| 3,385,197 | 5/1968 | Greber | 261/109 X |
| 3,552,727 | 1/1971 | Ortgies | 261/109 |
| 3,601,374 | 8/1971 | Wheeler | 261/109 X |
| 3,708,155 | 1/1973 | Holmberg et al. | 261/109 X |
| 3,933,196 | 1/1976 | Heller et al. | 261/DIG. 11 |
| 4,157,368 | 6/1979 | Fernandes | 261/DIG. 11 |

FOREIGN PATENT DOCUMENTS

| | | | |
|---|---|---|---|
| 2250071 | 4/1974 | Fed. Rep. of Germany | 165/DIG. 1 |
| 2309825 | 11/1976 | France | 261/109 |
| 796106 | 6/1958 | United Kingdom | 165/DIG. 1 |

*Primary Examiner*—Richard L. Chiesa
*Attorney, Agent, or Firm*—Kerkam, Stowell, Kondracki & Clarke

[57] ABSTRACT

Apparatus are provided for reducing detrimental wind influence on cooling towers by mounting at the air inlet to the towers a plurality of spaced baffles, each of which have continuous, smooth, curved, low wind resistance surfaces directed outwardly of the air inlet and high wind resistance surfaces directed toward the interior of the tower.

4 Claims, 7 Drawing Figures

APPARATUS FOR REDUCING THE DETRIMENTAL WIND INFLUENCE ON COOLING TOWERS

I. DESCRIPTION

1. Technical Field

The present invention relates to fluid, fluid cooling towers wherein one of the fluids is air which is placed in direct or indirect, or both direct and indirect, contact with air by natural draught or forced draft or natural and forced draft.

2. Background of Prior Art

It is known that wind has a detrimental influence on the cooling performance and efficiency of all types of air-cooled cooling towers substantially regardless of their type, shape and size. The influence of wind is greater on natural draught cooling towers because of the higher relative importance of the wind pressure as compared to forced draught cooling towers.

In view of the known detrimental influence of wind on the cooling performance of cooling towers, it is known in the art to provide means to reduce wind effect.

One common means of reducing the effect of wind on cooling equipment is disclosed and claimed in U.S. Pat. No. 3,933,196—Heller et al, wherein the air inlet to the cooling tower is provided with movable shutters or louvers. The movable shutters or louvers are adjusted by a control or regulating device according to actual wind conditions, and according to the patentees with such movable louvers the wind energy is used to aid in increasing the cooling effect.

The Heller Pat. No. 2,907,554 attempts to reduce the detrimental effects of wind by providing guiding walls in the interior of the cooling tower disposed so as to prevent repeated flow through the heat exchange units of air currents which have already been heated in passage through at least one of the units of the cooling device.

U.S. Pat. No. 4,157,368—Fernandes, resorts to a complex system of curved baffles which establish a downwardly flowing vortex which is reversed adjacent the lower end of the tower to provide a smaller intense upwardly flowing vortex which, according to the patentee, accelerates evaporative cooling due to the turbulent conditions existing in the tower.

It has been found that these prior art devices do not provide sufficient reduction in the detrimental effects of wind and, for example, devices such as shown in the Heller et al U.S. Pat. No. 3,933,196 are wholly impractical for wet-type cooling towers particularly in the winter when water spray freezing on the movable louvers prevents their effective operation when they are most needed.

BRIEF SUMMARY OF THE INVENTION

The present invention may be summarized as apparatus for reducing detrimental wind influence on cooling towers wherein the air inlet, or inlets, to the cooling tower are provided with a plurality of spaced baffles, each of which have continuous smooth curved low wind resistant surfaces directed outwardly of the air inlet and high wind resistant surfaces directed toward the interior of the tower.

The invention will be more particularly described in reference to the accompanying drawings.

DETAILED DESCRIPTION OF INVENTION

Figure 1:
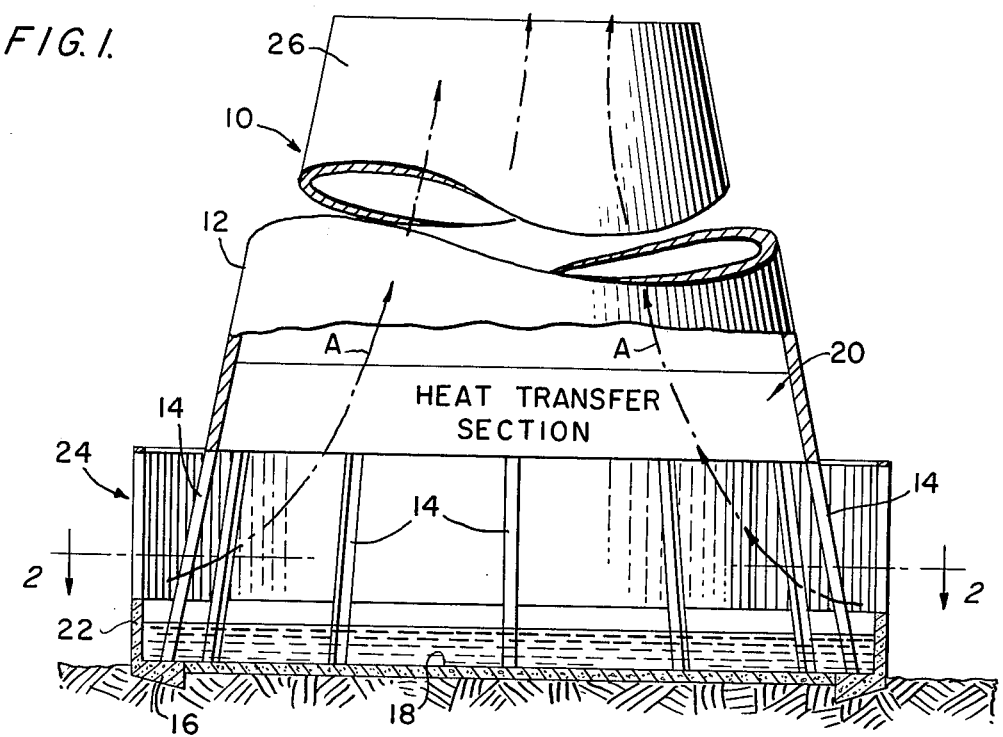
FIG. 1 illustrates in partial vertical section a portion of a conventional natural draught cooling tower illustrating the main components thereof in relation to the fixed baffle means of the present invention, and showing the desired flow path of cooling air through the tower.

Referring to FIG. 1 of the drawing, 10 denotes a natural draught cooling tower having a shell 12 supported by a plurality of legs 14 on a circular foundation 16 which defines interioraly thereof a basin 18 for the liquid falling through the heat exchange or transfer section generally designated 20. In the drawing the heat transfer section is not illustrated in detail as any of the known forms may be mounted within the tower. About the air inlet to the tower extending from the peripheral basin wall 22 upwardly to the top of the legs 14 are mounted a plurality of spaced baffles 24 which form the wind influence control means of the present invention. Thus, in cooling the fluid to be cooled, air follows the air flow path illustrated by directional arrows A from externally of the baffles 24 into the interior of the tower to sweep upwardly through the heat transfer section hence out of the top 26 of the tower.

The directional arrows A illustrate the ideal flow path for the air. However, it has been found detrimental wind influence on tower efficiency begins for wind velocities as low as half of the air inlet velocity which is typical round natural draught towers have inlet velocities from 10-15 fps (7-10 mph).

It will be appreciated by those skilled in the art that cooling towers or devices which do not resort wholly on natural draught, the adverse influence of wind is generally less due to the presence of mechanical air moving devices internally of the tower or mounted about the periphery of the tower, or both.

Figure 2:
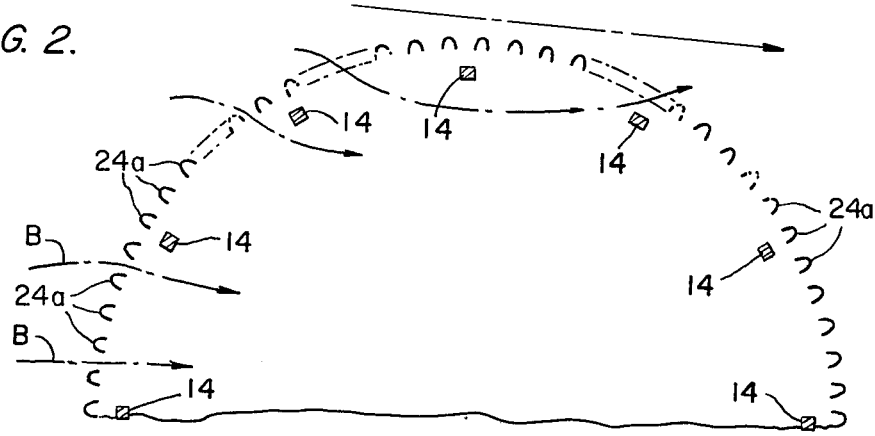
FIG. 2 is a fragmentary sectional view on line 2—2 of FIG. 1.
Figure 3:
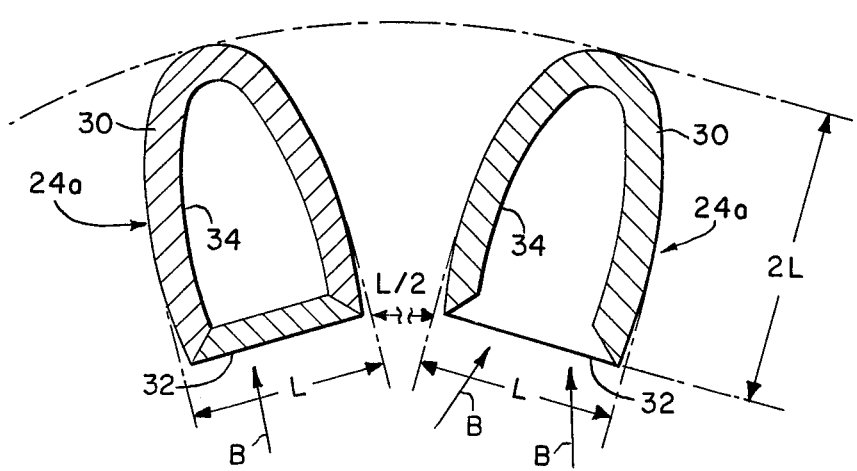
FIG. 3 illustrates one configuration for the fixed baffles of the invention.
Figure 4:
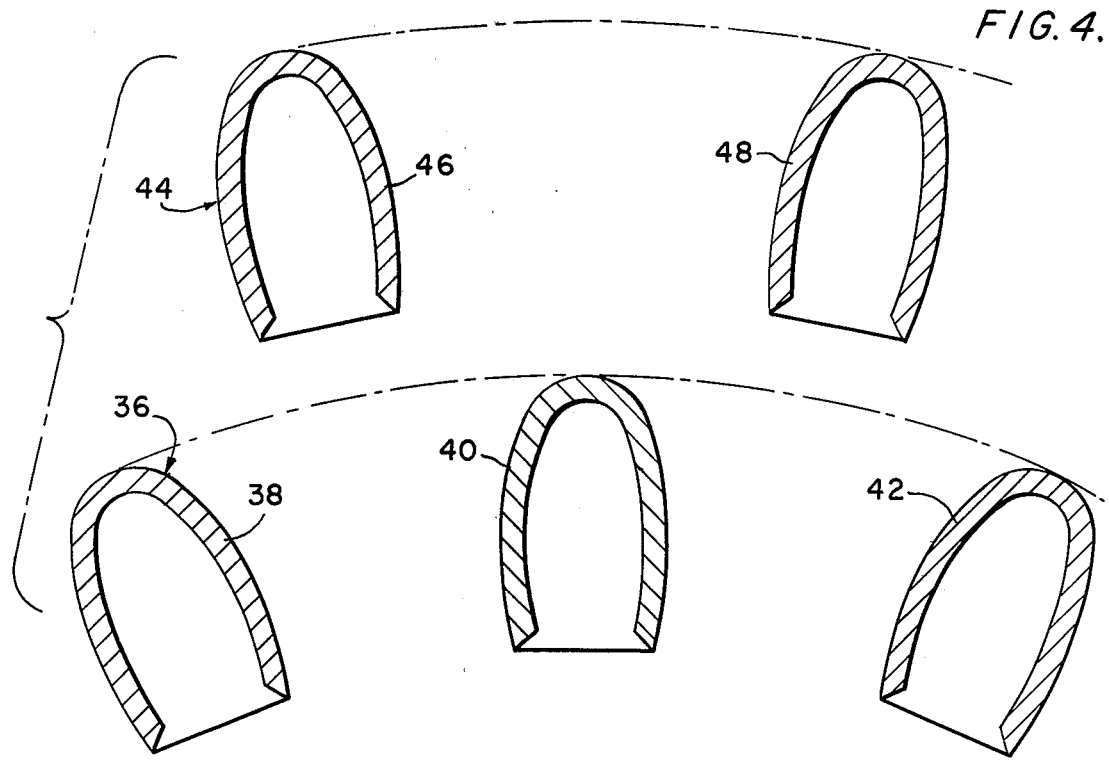
FIG. 4 illustrates an arrangement of the baffles illustrated in FIG. 3 in a particular ideal configuration.

Referring now more particularly to FIGS. 2 and 3, the adverse influence of wind in the natural draught cooling tower illustrated in FIG. 1 is materially reduced by the plurality of fixed baffles 24a. Each of the baffles 24a is configured as a truncated airfoil shape in transverse section to provide a smoothly curved low wind resistance surface 30 directed toward the outside of the tower and a high resistance surface 32 directed inwardly of the tower. The effect of the high resistant surface 32 is improved by forming the baffles 24a of hollow configuration such that air moving substantially in the direction of the directional arrows B, FIG. 2, will run into resistance by the flat face 32, or where the face 32 is wall-less by being directed interiorly of the baffle and being caused to reverse direction by the interior wall 34. A particularly ideal dimension for the truncated air flow configured baffles 24a is such that the widest dimension of the baffle is equal to the length L with the spacings between baffles having the dimension L/2 and an overall transverse length of 2L, and of course a length sufficient to extend, for example, vertically the height of the air inlet.

Even greater improvements are provided by installing two rows of baffles arranged such that the inner row, that is, baffles 38, 40 and 42 of inner row 36 are positioned inwardly and between the outside row 44 composed of baffles 46, 48, etc. Employing the two rows of baffles permits spacing adjacent baffles of rows 36 and 44 a greater distance, thus reducing blockage of air flow while effectively reducing the adverse wind effects.

Figure 5:
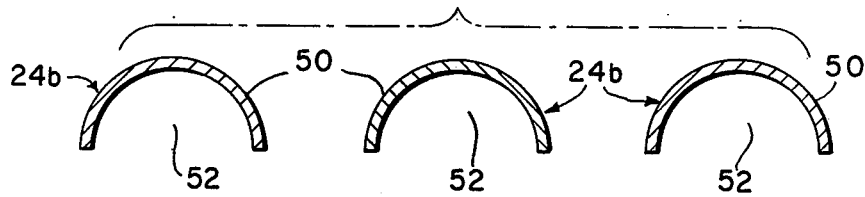
FIG. 5 illustrates a very simple form of baffles suitable for use in carrying out the present invention.

Referring now to FIG. 5, there is illustrated a simple and inexpensive form of baffle for carrying out the principals of the present invention. In FIG. 5 the baffles 24b comprise hemicylindrical elements which may be manufactured by rolling or bending sheet stock or made simply by cutting a pipe lengthwise to form a pair of the elements 24b.

The hemicylindrical elements 24b are positioned such that the curved face 50 is directed towards the outside of the cooling device or tower, while the open-end face 52 is directed inwardly of the tower to present a low resistance face towards the wind and a high resistance surface inwardly of the tower.

The baffles 24a and 24b illustrated in FIGS. 2-5 may be made of substantially any heavy construction materials, such as concrete, metal such as steel and aluminum, glass reinforced cement, asbestos reinforced cement, glass reinforced plastics, lumber, etc. The construction material is thus not critical as long as it has sufficient strength to resist undue bending by wind and sufficient durability to provide an adequate service life.

Figure 6:
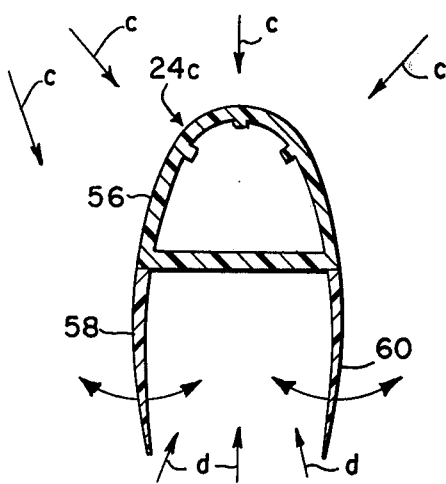
FIG. 6 illustrates a baffle constructed in accordance with the teachings of the present invention formed of rigid and flexible elements.

Referring now to FIG. 6, there is illustrated an extruded baffle 24c consisting of a rigid airfoil configured portion 56 and a pair of flexible trailing edge elements 58 and 60. The trailing edge elements 58 and 60 have a tendency to "close" or move towards each other when air is directed in the direction of the directional arrows C and to "open" when air is moving in the direction of directional arrows d, that is when air attempts to escape after having entered the cooling tower. The configuration illustrated in transverse section in FIG. 6 is readily manufactured by conventional simultaneous extrusion of two compatible materials, one rigid, and the other plasticized and flexible by well-known extrusion processes.

Figure 7:
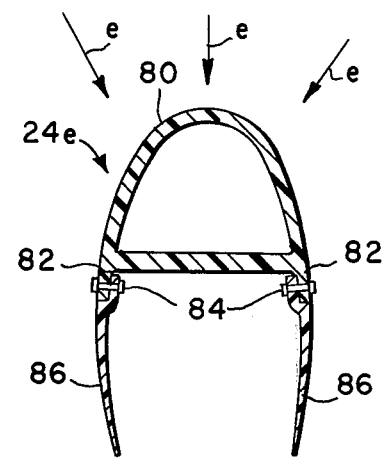
FIG. 7 illustrates a further form of the present invention wherein the baffles are composed of rigid and flexible materials.

Referring now to FIG. 7, there is illustrated a composite baffle useful for carrying out the teachings of the present invention and generally designated 24e. The baffle 24e includes a rigid airfoil, low wind resistant shaped member 80 formed, for example, of reinforced concrete or extruded metal having a pair of wind elements 82 running the length thereof.

To each of the wing elements 82 is attached, such as by rivets 84, a pair of flexible, open, trailing edge pieces 86 formed of rubber or resilient plastic material. The flexible trailing edge members 86 would function in the manner described in reference to FIG. 6, that is, the trailing edges 86 have a tendency to "close", that is, move towards each other when the air is moving in the direction of the directional arrows e, thereby further reducing air resistance and to open up or move further apart when the air attempts to leave the confines of the chimney.

EXAMPLE

In a natural draught cooling tower having an overall height of about 400 ft. and a diameter at the base of about 350 ft. with an air opening between the base and the lentil of the tower of approximately 50 ft., satisfactory results are obtained when the dimension L, FIG. 3 of the drawings, is from 0.5 ft. to 5.0 ft.

From the foregoing description, it will be seen that the objects set forth herein and those made apparent from the description are fully accomplished by the improved apparatus for reducing detrimental wind influence on cooling towers.

STATEMENT OF INDUSTRIAL APPLICATION

Cooling towers wherein the cooling medium is at least in part air which is placed in direct or indirect, or both direct and indirect contact with another fluid are improved by reducing the detrimental wind influence in the cooling tower.

I claim:

1. Apparatus for reducing detrimental wind influence on cooling towers comprising:
 a cooling tower;
 air inlet means at the lower end of the tower;
 air outlet means at the upper end of the tower;
 air and fluid contact means in the air path between the air inlet means and the air oulet means; and
 means mounted in the air inlet means for reducing detrimental wind influence, said means comprising a plurality of spaced baffles, each of said baffles configured as a truncated airfoil in transverse section and having a continuous smooth curved low wind resistance surface directed outwardly of the air inlet means, and a high wind resistance surface directed toward the interior of the tower.

2. The apparatus as defined in claim 1 wherein each of the baffles has a pair of spaced, flexible trailing edge portions.

3. The apparatus as defined in claim 1 wherein each baffle, in transverse section, has a maximum width L, length 2L and are spaced a distance of L/2 at the air inlet.

4. The apparatus defined in claim 3 wherein L is from 1/10th to 1/100th of the air inlet height.

* * * * *